United States Patent
Dickson et al.

(10) Patent No.: US 7,694,308 B1
(45) Date of Patent: Apr. 6, 2010

(54) ENTERPRISE APPLICATION MAPPING TOOL AND DATASTORE WITH TARGET STATE DIMENSION

(75) Inventors: Thomas S. Dickson, Overland Park, KS (US); Robert A. Mullinnix, Overland Park, KS (US); Paul H. Park, Flower Mound, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1242 days.

(21) Appl. No.: 11/182,266

(22) Filed: Jul. 15, 2005

(51) Int. Cl.
*G06F 13/00* (2006.01)
(52) U.S. Cl. .................. 719/312; 719/310; 715/203; 715/204; 715/205
(58) Field of Classification Search .............. 719/310, 719/312; 715/203, 204, 205
See application file for complete search history.

(56) References Cited

U.S. PATENT DOCUMENTS

| | | | |
|---|---|---|---|
| 5,295,244 A | 3/1994 | Dev et al. | |
| 5,555,365 A * | 9/1996 | Selby et al. | 715/765 |
| 5,696,914 A * | 12/1997 | Nahaboo et al. | 715/763 |
| 7,036,085 B2 | 4/2006 | Barros | 715/764 |
| 7,139,983 B2 | 11/2006 | Kelts | |
| 7,373,361 B2 * | 5/2008 | Monroe et al. | 707/104.1 |
| 7,415,697 B1 | 8/2008 | Houlding | |
| 7,548,925 B2 * | 6/2009 | Bradlee et al. | 707/100 |
| 2002/0078077 A1 | 6/2002 | Baumann et al. | |
| 2004/0031015 A1* | 2/2004 | Ben-Romdhane et al. | 717/107 |
| 2004/0093381 A1 | 5/2004 | Hodges et al. | |
| 2004/0128395 A1 | 7/2004 | Miyazaki | |
| 2005/0251501 A1 | 11/2005 | Phillips et al. | |
| 2005/0251527 A1 | 11/2005 | Phillips et al. | |

OTHER PUBLICATIONS

Dickson, Thomas S., Evergreen Target State Migration Mapping Tool and Method, filed Jul. 15, 2005, U.S. Appl. No. 11/182,399, Specification (25 pgs.), Drawings (6 sheets).
Office Action dated Jan. 28, 2008, 17 pages, U.S. Appl. No. 11/182,399, filed Jul. 15, 2005.
Final Office Action dated Aug. 19, 2008, 20 pages, U.S. Appl. No. 11/182,399, filed Jul. 15, 2005.
Office Action dated Dec. 2, 2008, 23 pages, U.S. Appl. No. 11/182,399, filed Jul. 15, 2005.
Grundy, John, et al., "High-level Static and Dynamic Visualization of Software Architecture," IEEE, 2000, 8 pages.

(Continued)

*Primary Examiner*—Andy Ho (57) ABSTRACT

A system for representing the state of an enterprise software architecture is disclosed. The system comprises a datastore that contains a plurality of attributes of applications and of interfaces, including a state attribute. The system also comprises a plurality of stencils operable to define a graphic. The stencils are each associated with a script: that links back to the datastore, an application stencil operable to define an application graphic and associated with an application stencil script and an interface stencil operable to define an interface graphic and associated with an interface stencil. The system also comprises a template operable to define a drawing of an enterprise software architecture using the stencils.

20 Claims, 5 Drawing Sheets

OTHER PUBLICATIONS

Riva, Claudio, et al., "Combining Static and Dynamic Views for Architecture Reconstruction," IEEE, 2002, 9 pages.

Stevens, Michael E., et al., "Using a Lease to Manage Service Contracts in Service Oriented Architectures," Proceedings of the Tenth Americas Conference on Information Systems, 2004, 9 pages.

Jones, Steve, "Toward an Acceptable Definition of Service," IEEE Software, May/Jun. 2005, 7 Pages.

Gorton, Ian, et al., "Tool Support for Just-in-Time Architecture Reconstruction and Evaluation: An Experience Report," ACM, May 2005, 10 Pages.

Deuresn, et al., "Symphony, View-Driven Software Architecture Reconstruction," CWI, 2004, 18 Pages.

Stoermer, A Van, et al., "Moving Towards Quality Attribute Driven Software Architecture Reconstruction," IEEE, 2003, 11 Pages.

Stoermer, Christoph, et al., "Practice Patterns for Architecture Reconstruction," IEEE, 2002, 10 Pages.

Stoermer, Christoph, et al., "Architectural Views through Collapsing Strategies," IEEE, 2004, 11 Pages.

Telea, Alexandru, et al., "An Open Visualization Toolkit for Reverse Architecting," IEEE, 2002, 8 Pages.

Final Office Action dated Jun. 4, 2009, U.S. Appl. No. 11/182,399, filed Jul. 15, 2005.

Advisory Action dated Aug. 24, 2009, U.S. Appl. No. 11/182,399, filed Jul. 15, 2005.

Gomaa, Hassan, "Reusable Software Requirements and Architectures for Families of Systems," Elsevier Science Inc., 1995.

Office Action dated Nov. 9, 2009, U.S. Appl. No. 11/182,399, filed on Jul. 15, 2005.

Gansner, Edward, et al., "Visualizing for Telecommunication Services," AMC, dated 2003, pp. 151-157 and 215.

Bennett, Keith, et al., "Software Maintenance and Evolution: A Roadmap," AMC 2000, pp. 73-87.

Buchsbaum, Adam, et al., "Visualizing and Analyzing Software Infrastructures," IEEE Software, Sep./Oct. 2001, p. 62-70.

Microsoft Office Online, Microsoft Office Visio, "Copy and Paste Shapes From an Existing Drawing into a New Drawing," dated 2009, 5 pages.

* cited by examiner

ENTERPRISE APPLICATION MAPPING TOOL AND DATASTORE WITH TARGET STATE DIMENSION

CROSS-REFERENCE TO RELATED APPLICATIONS

This application includes subject matter related to U.S. patent application Ser. No. 11/182,399, entitled "Evergreen Target State Migration Mapping Tool and Process," filed concurrently herewith by Thomas S. Dickson, et al, and incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software tools, and more particularly, but not by way of limitation, to an enterprise application mapping tool and datastore with target state dimension.

BACKGROUND OF THE INVENTION

Enterprise software systems may comprise many independent computer programs, applications, modules, or components. These applications may execute in a distributed manner on several different computers. Applications often require the services provided by other applications. A first application requesting a service from a second application may be said to act in a client role while the second application may be said to act in a server role. The first application may provide services to yet other applications and may in that case act in a server role. The intercommunicating applications may be executing on computers located far apart and in different divisions of the company.

The links between applications and/or computers may be provided by different interfaces using different technologies. Different interfaces may be associated with different advantages and drawbacks relative to data throughput speeds, ease of access to information, privacy and security of enterprise data, and commonality among different applications. Applications may access datastores and/or databases through one or more interfaces. In some cases, an application may rely upon a dedicated datastore reserved solely for the use of the application, while in other cases applications may rely upon a shared datastore shared by several applications.

SUMMARY OF THE INVENTION

A system for representing the state of an enterprise software architecture is disclosed. The system comprises a datastore that contains a plurality of attributes of applications and of interfaces, including a state attribute. The system also comprises a plurality of stencils operable to define a graphic. The stencils are each associated with a script: that links back to the datastore, an application stencil operable to define an application graphic and associated with an application stencil script and an interface stencil operable to define an interface graphic and associated with an interface stencil. The system also comprises a template operable to define a drawing of an enterprise software architecture using the stencils.

A computer implemented tool is also disclosed. The computer implemented tool comprises a datastore containing a plurality of application and interface entries. Each application entry includes attributes associated with the application, and each interface entry includes attributes associated with the interface. The computer implemented tool also comprises a plurality of stencils including a first stencil to illustrate an application and a second stencil operable to illustrate an interface, the first and second stencils associated with a script operable to retrieve information from the datastore. The computer implemented tool also comprises a drawing template operable to compose a drawing of an enterprise software architecture based in part on the plurality of stencils. The drawing template receives inputs that identify interconnections among the applications and interfaces based on the stencils and inputs that define the attributes of the application and the interface. The computer implemented tool optionally displays the application and the interface based on a date point-of-view attribute.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

In a large enterprise, several independent groups of software developers may work concurrently on related and/or unrelated aspects of the enterprise software systems. Software architects may be responsible for defining the architecture or general structure of the software solutions under development and for the evolution of the architecture over time. Because the architecture may comprise many applications and interfaces, as many as 1,600 applications in an exemplary enterprise, it may be difficult to understand the relationships among applications and interfaces and monitor the status of the applications and interfaces over time. For example, a software architect may develop the architecture for a new development based on reusing an application only to discover later that application is scheduled for retirement a year after the new development is projected to be deployed. Disclosed herein is an enterprise application mapping tool which captures information about applications and interfaces, including a disposition status and associated disposition date, which may assist software architects to understand the relationships among applications and interfaces and to know the future plans for the applications and interfaces.

Figure 1:
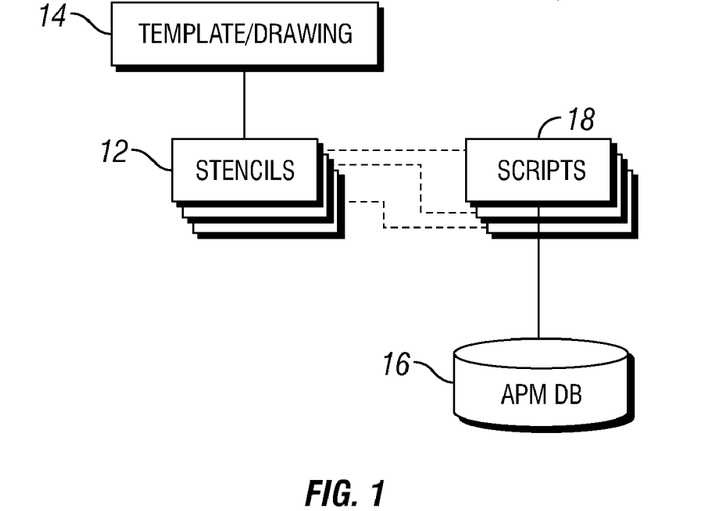
FIG. 1 is a block diagram of an enterprise application mapping tool according to an embodiment of the disclosure.

Turning now to FIG. 1, an enterprise application mapping tool and datastore, referred to hereinafter as the mapping tool 10, is depicted. The mapping tool 10 comprises a plurality of stencils 12 accessible through a drawing template 14. An asset portfolio management (APM) datastore 16 is accessible to the stencils 12 via a plurality of scripts 18. In an embodiment, the drawing template 14 and the stencils 12 are constructed using the Microsoft Visio drawing application. The scripts 18 are developed using a VBScripting script language accessible from within the Microsoft Visio drawing application environment. When constructing a map of an enterprise software architecture, the user selects from the stencils, that represent elements of the map, and places a stencil instance appropriately within the template or drawing that represents the map. The user is able to associate the otherwise generic stencils with, for example, particular applications or interfaces that are defined in the asset portfolio management datastore 16. The user may also modify attributes associated with the elements.

The asset portfolio management datastore 16 includes a plurality of application entries and a plurality of interface entries. These entries may also be referred to as objects, either with reference to information stored in the asset portfolio management datastore 16 or with reference to using the information in the mapping tool 10. Each application entry contains information related to an application which may include an application identity, a disposition status or disposition state, a deployment date, a retirement date, a target application, a responsible vice president, and a responsible director. Each interface entry contains information related to an interface which may include a deployment date, a retirement date, an interface control number (ICN), a technology, a key data, an originating application, and a destination application for example, but other application information may be included.

In an embodiment, the disposition status or state may take values including retire, eliminate, consolidate, niche, and target state architecture for example, but other information may be captured as well. A retire disposition status indicates that the application is to be retired from service. The eliminate disposition status indicates that the application is to be replaced by another application which accomplishes the same functionality. The consolidate disposition status indicates that the application will be integrated or consolidated with another existing application. The niche disposition status indicates that the application will continue in use for specialized niche needs. The target state architecture disposition status indicates that the application is the preferred implementation or solution.

In another embodiment, the disposition status or state may take values such as improve, transform, integrate, consolidate, and continue. The improve status may indicate that the subject application does not support current business processes and needs to be fixed. The transform status may indicate that the subject application does not support future business processes and needs to be enhanced to support those future processes. The integrate status may indicate that the subject application should be combined with other applications having like functionality. The consolidate status may indicate that the subject application should be combined within another existing application, adding possibly unlike functionality. The continue status may indicate that the subject application is positioned to support the present and future business processes and hence needs no modification. Other disposition status values or states are also contemplated, and the present disclosure should not be limited to the arbitrary names enumerated above or the number of disposition status values or states identified heretofor.

The disposition status of an application may be time based. For example, a first period in 2006 application X may have the target state architecture disposition status while over some period in 2007 application X may have the niche disposition status. Each entry may contain several disposition fields, each disposition associated with the date when the subject application transitions to the disposition value.

The identity associated with an application identifies the application within the asset portfolio management datastore 16. The deployment date and retirement date associated with an application indicate when the application is planned for deployment and retirement, respectively. The target application information may be optional, and references an application into which the subject application is planned to be consolidated or integrated. The identity may identify the management personnel who have responsibility or ownership for the subject application.

Each interface entry contains information related to an interface which may include a deployment date, a retirement date, an interface control number (ICN), a technology, a key data, an originating application, and a destination application. The deployment date and retirement date associated with an interface indicate when the interface is planned for deployment and retirement, respectively. The interface control number identifies the interface within the asset portfolio management datastore 16, for example using the application identification of the two applications between which the interface communicates. In this example, the interface control number is an ordered pair of application identifications, for example a first application identification corresponds to the application that initiates communication and a second application identification corresponds to the application that receives and responds to communication. The technology identifies what technology is employed to implement the interface, for example web services, MSQueue, java messaging service (JMS), java remote method invocation (RMI), and common object request broker architecture (CORBA). The key data may identify one or more key data elements conveyed using the interface, for example customer data or orders. The originating application and the destination application identify the application which originates communication over the interface and the application which receives communication over the interface, respectively.

Stencils 12, as described above, are selected to create instances of common elements of the enterprise software architecture. While the stencil construct may be intrinsic to the subject drawing tool employed, for example the Microsoft Visio drawing tool, stencils specifically representing software application graphics, application group graphics, application component graphics, interface graphics, integrated datastore graphics, data warehouse graphics, and functional domain graphics may not be provided in the basic drawing tool. In the case of Microsoft Visio, custom stencils may be created to provide the desired enterprise software architecture graphical elements. To provide useful functionality, the scripts 18 may be associated with the stencils 12, thereby providing a link between a stencil instance and an entry in the asset portfolio management datastore 16 that provides information about the stencil instance, for example an application or an interface. In an embodiment, VisualBasic Scripting is used to create the scripts 18, but in another embodiment some other scripting or programming language may be used to provide this functionality.

In the preferred embodiment, the enterprise software architecture is structured hierarchically as a plurality of application groups or major domains. For example, major domain areas may include electronic commerce (E-commerce), customer care and acquisition, service delivery, service assurance, and billing or revenue management. Further, each application group or major domain is structured into one or more functional areas. Functional areas may include marketing, sales, commissioning, knowledge base, order entry, and customer management. Each functional area may comprise a plurality of applications. Applications may comprise a plurality of application components. The structured organization of the enterprise software architecture may conform to an industry standard architecture model, for example the enhanced telecommunications organization model (eTOM), the customer lifecycle model, or some other industry standard architectural model. Major domain areas may be depicted with different colors to distinguish among them.

A lasso utility may be employed to select a portion of the complete enterprise software architecture. This portion may be named, saved, and worked on separately from the rest of the enterprise software architecture graphical rendering. Later, this portion may be reintegrated with the complete enterprise software architecture graphical rendering.

The template 14 provides a control to select in what time reference to display the enterprise software architecture. In an embodiment, time reference selections include current time, current time+1 year, current time+2 years, current time+3 years, and all years. In other embodiments, other time periods may be employed. An application and/or interface is displayed in gray in the time reference that represents the first year of retirement. In later years retired application and/or interface is removed from the display, leaving a noticeable gap. An application and/or interface is displayed in blue in the time reference that represents the first year of introduction.

The mapping tool 10 permits the architect to see a portion of the enterprise software architecture, for example an application, in context. The mapping tool 10 promotes the architect visualizing the effect of a proposed change, for example retiring an interface, by depicting what the subject interface connects to as a function of time, for example based on the selected time reference.

Figure 2:
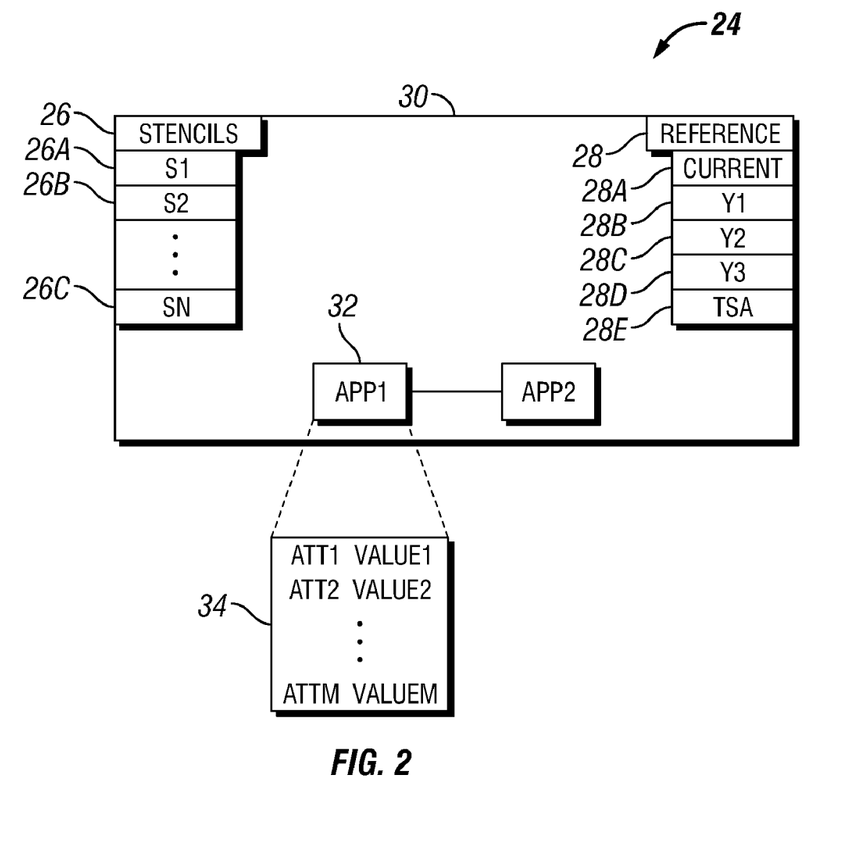
FIG. 2 is an illustration of an exemplary graphical user interface for controlling the enterprise application mapping tool according to an embodiment of the disclosure.

Turning now to FIG. 2, an exemplary graphical user interface (GUI) 24 for using the mapping tool 10 is depicted. The GUI 24 provides a stencil drop-down 26 and a time reference drop-down 28. The stencil drop-down 26 provides access to a plurality of stencils—a first stencil 26a, a second stencil 26b, and a third stencil 26c—for example an application stencil and an interface stencil. Selecting one of the stencils 26 causes an instance of the subject stencil to appear in a drawing frame 30 of the GUI 24. The time reference drop-down 28 provides access to a current time reference 28a, a one year out time reference 28b, a two years out time reference 28c, a three years out time reference 28d, and a target state architecture reference 28e. Selecting one of the time references 28 causes the enterprise software architecture to display in the according to the selected time reference. Selecting an application or interface, for example an application 32, causes an attribute dialog box 34 to appear. The attribute dialog box 32 displays the current values of the selected. Note that other features and controls may be provided by the GUI 24 and that the GUI 24 is only exemplary. In other embodiments, the GUI 24 may have other control and display capabilities.

Figure 3:
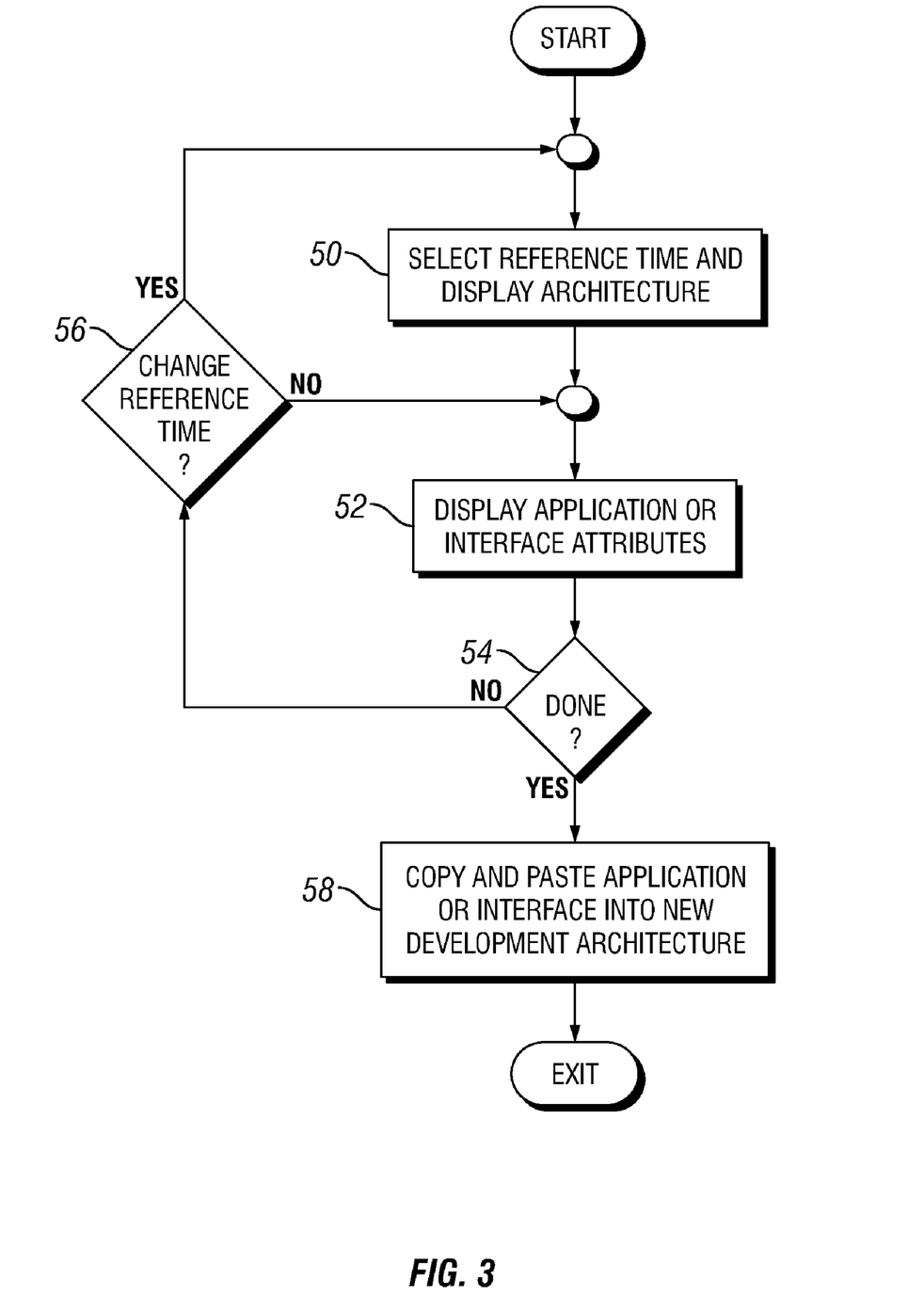
FIG. 3 is a flow diagram of a method of managing an enterprise software architecture according to an embodiment of the disclosure.

Turning now to FIG. 3, a method for using the mapping tool 10 to manage, in part, the enterprise software architecture is depicted. In block 50, a reference time is selected according to which the enterprise software architecture, which may also be referred to as the architecture, is displayed. As discussed above, the time reference may select all reference times, the current reference time, or a specific year from several years, or a specific period from several periods. The mapping tool 10 displays the portions of the architecture which are not retired in the selected reference time. The architecture depiction includes indications of major domains, functional areas, applications, application components, and interfaces. The display of the architecture may be too large to display on a single screen, and the architect or user may need to scroll up/down and/or left/right to view all portions of the architecture. The architect or user may seek an application providing a needed functionality or an interface providing a needed connectivity in order to reuse the application or interface in a new software development.

The method proceeds to block 52 where a drill down view of the subject application or interface is selected which displays the attributes of the application or interface. In the drill down view the attributes of the subject application or interface are displayed for examination and/or modification. The method proceeds to block 54 where the architect decides if the application or interface provides the needed functionality or connectivity. If the application or interface does not provide the needed functionality or connectivity, the method proceeds to block 56. In block 56, the architect or user may change the reference time of the display of the architecture. If the reference time is changed, the method returns to block 50. If the reference time is unaltered, the method returns to block 52.

If the application or interface does provide the needed functionality or connectivity, the method proceeds to block 58. In block 58 the architect or user copies the graphical representation of the application or interface into the subject development architecture. The subject application or interface may then be used without change for the development software.

Figure 4:
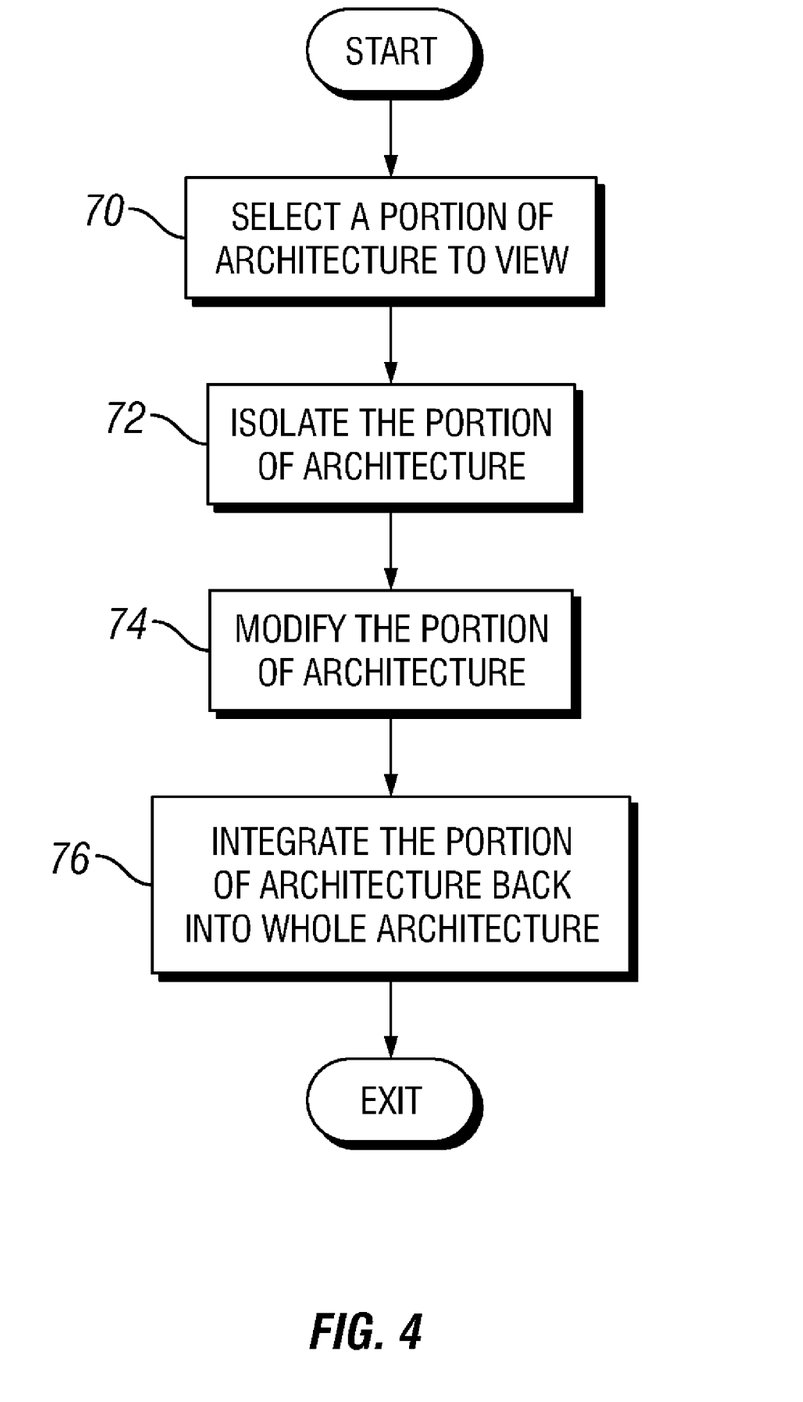
FIG. 4 is a flow diagram of another method of managing the enterprise software architecture according to an embodiment of the disclosure.

Turning now to FIG. 4, a method for using the mapping tool 10 to manage, in part, the enterprise software architecture is depicted. In block 70 the architect or user selects a portion of the architecture to view, perhaps using a lasso functionality such as is offered by the Microsoft Visio drawing tool. The method proceeds to block 72 where the selected portion of the architecture is isolated, to permit the architect or user to work on and modify this portion of the architecture without interfering with the work of others. This may be accomplished, for example, by saving the selected portion of the architecture as a different drawing.

The method proceeds to block 74 where the architect or user modifies at least part of the isolated architecture portion, for example by adding in a new application and connecting this new application with other previously existing applications with interfaces. The method proceeds to block 76 where the architect or user integrates the isolated architecture portion back into the whole architecture. The process then exits.

Figure 5:
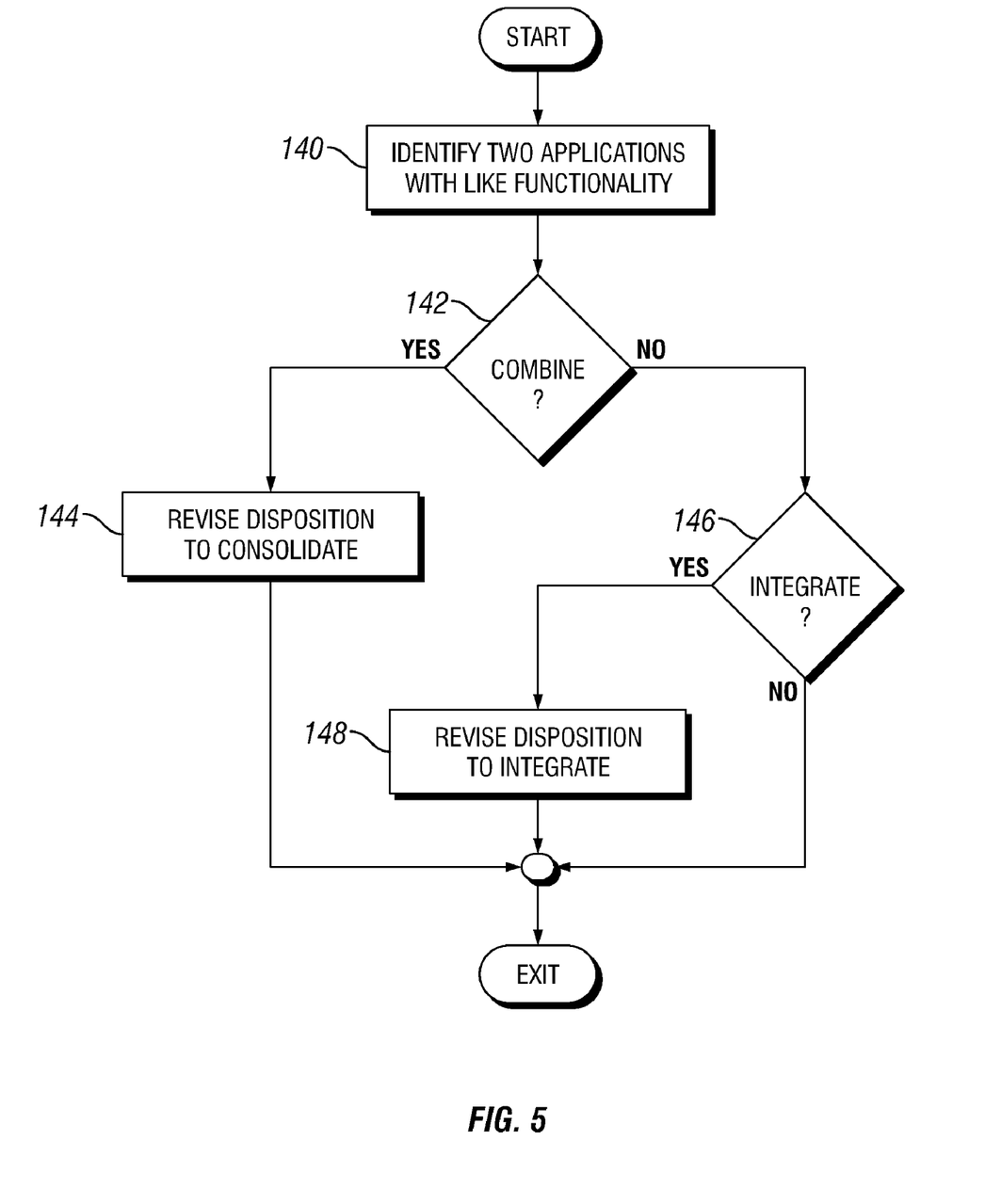
FIG. 5 is a flow diagram of another method of managing the enterprise software architecture according to an embodiment of the disclosure.

Turning now to FIG. 5, a method for using the mapping tool 10 to manage, in part, the enterprise software architecture is depicted. The process begins in block 140 where the architecture is displayed using the mapping tool 10 and an architect or user employs the mapping tool 10 to identify two applications with like functionality. The process proceeds to block 142 where a decision is made to combine or not combine the two applications. If the applications are to be combined, the process proceeds to block 144 where the disposition status of both applications is changed to consolidate. This is accomplished by selecting the drill down view of each application in turn and modifying the disposition status of the subject applications. The process then exits.

If the two applications are not to be combined, the process proceeds to block 146 where a decision is made to integrate or not integrate the two applications. If the applications are not integrated, the process exits. If the applications are to be integrated, the process proceeds to block 148 where the disposition status of both applications is changed to integrate. The process then exits.

In one embodiment, the mapping tool 10 may be operable to graphically illustrate, such as via the GUI 24, that a proposed new element being mapped may lose one or more of its connected components in a certain time, such as in 1 year. This may operate as an alert at the time that the new element is added, or a report may be run that identifies these elements. The user may override and connect to these components, or identify and connect to alternate resources.

In still other embodiments, the mapping tool 10 is operable to graphically illustrate, such as via the GUI 24, any applications and interfaces that may be impacted by a planned retirement of a system, application, or interface, for example. The impact report may also illustrate impacts at future times or time-frames, based on applications that will be retired at that time.

Figure 6:
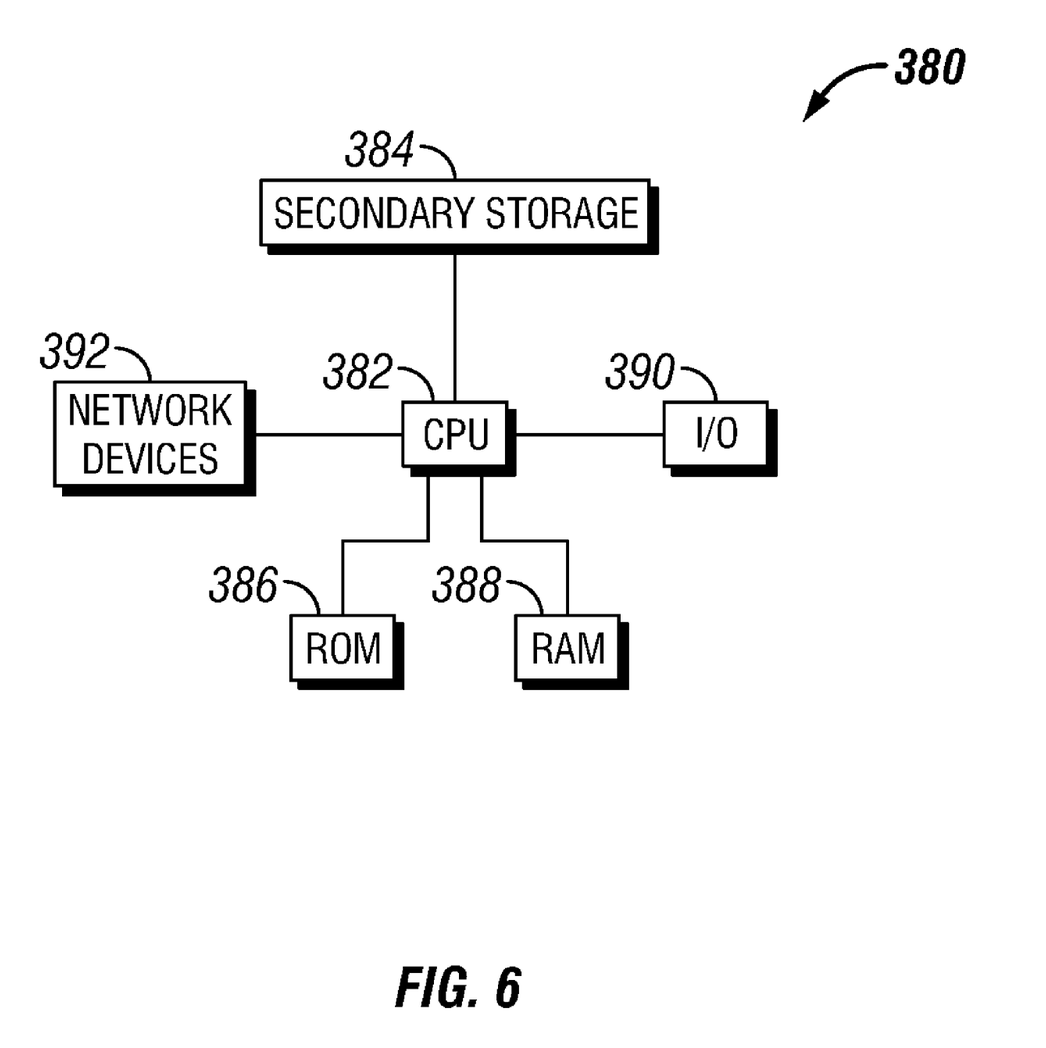
FIG. 6 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for representing the state of an enterprise software architecture, comprising:

a datastore operable to contain a plurality of attributes of applications and a plurality of attributes of interfaces, wherein the attributes of applications and the attributes of interfaces include a state attribute;

a plurality of stencils each operable to define a graphic;

an application stencil script associated with the stencils operable to provide a link from an application graphic to an associated application in the datastore, the application graphic defined using one of the stencils;

an interface stencil script associated with the stencils operable to provide a link from an interface graphic to an associated interface in the datastore, the interface graphic defined using one of the stencils; and a template operable to define a drawing of an enterprise software architecture using the stencils.

2. The system of claim 1, wherein the graphics are selected from the group consisting of the application graphic, the interface graphic, an application group graphic, a component graphic, a database graphic, an integrated datastore graphic, a data warehouse graphic, and a functional domain graphic.

3. The system of claim 1, wherein values of the state attribute include target state architecture, niche, eliminate, and retire.

4. The system of claim 1, wherein values of the state attribute include improve, transform, integrate, consolidate, and continue.

5. The system of claim 1, wherein the stencils and template are customized from an off-the-shelf drawing tool.

6. The system of claim 5, wherein the off-the-shelf drawing tool is Microsoft Visio.

7. The system of claim 1, wherein the application stencil script and the interface stencil script are written using a Visual Basic Scripting language.

8. The system of claim 1, wherein the attributes associated with applications further include an application identity, an ownership, and a year of retirement.

9. The system of claim 8, wherein the ownership includes a name of an individual and their title.

10. The system of claim 1, wherein the attributes associated with the interfaces further include a technology, an interface direction, a content, an originating application identity, a terminating application identity, a begin use year, and an end use year.

11. The system of claim 10, wherein the attribute values of the technology include java messaging service, java remote method invocation, MSQueue, web services, and common object request broker architecture.

12. A computer implemented tool, comprising:

a datastore containing a plurality of application entries and a plurality of interface entries, each application entry including attributes associated with the application, each interface entry including attributes associated with the interface;

a plurality of stencils including a first stencil operable to illustrate an application, a second stencil operable to illustrate an interface, the first and second stencils associated with a script operable to retrieve information from the datastore; and a drawing template operable to compose a drawing of an enterprise software architecture based in part on the plurality of stencils, the drawing template to receive inputs identifying interconnections among the applications and interfaces based on the stencils and defining attributes of the application and the interface, and to optionally display the application and the interface based on a date point-of-view attribute.

13. The computer implemented tool of claim 12, wherein the stencils include a plurality of domain and functional areas based on an enhanced telecommunications operation map.

14. The computer implemented tool of claim 13, wherein the stencils include an application stencil, an interface stencil, an application group stencil, an application database stencil, an integrated datastore stencil, a data warehouse stencil, and a function domain stencil.

15. The computer implemented tool of claim 12, wherein the application attributes include a deployment year, a retirement year, and a disposition, wherein the disposition includes a retire state, an eliminate state, a consolidate state, a niche state, and a target state architecture state, wherein the interface attributes include a interface identification, an ordered pair of application identifications, a technology identification, a key data, a begin year, and an end year.

16. The computer implemented tool of claim 12, wherein the application attributes include a deployment year, a retirement year, and a disposition, wherein the disposition includes an improve state, a transform state, an integrate sate, a consolidate state, and a continue state, wherein the interface attributes include a interface identification, an ordered pair of application identifications, a technology identification, a key data, a begin year, and an end year.

17. The computer implemented tool of claim 12, wherein the drawing template is operable to display a first architecture of an enterprise based on a first date attribute of applications and interfaces and a second architecture of the enterprise based on a second date attribute of applications and interfaces.

18. The computer implemented tool of claim 12, wherein the script associated with the stencils are written using a Visual Basic scripting language.

19. The computer implemented tool of claim 12, wherein the application attributes include an ownership attribute that identifies an individual and their title.

20. The computer implemented tool of claim 12, wherein the template is enabled by a Microsoft Visio drawing computer enabled tool.

* * * * *

UNITED STATES PATENT AND TRADEMARK OFFICE
CERTIFICATE OF CORRECTION

PATENT NO. : 7,694,308 B1  
APPLICATION NO. : 11/182266  
DATED : April 6, 2010  
INVENTOR(S) : Dickson et al.

Page 1 of 1

It is certified that error appears in the above-identified patent and that said Letters Patent is hereby corrected as shown below:

Column 10, Line 33, "sate" should read --state--

Signed and Sealed this  
Twenty-eighth Day of December, 2010

David J. Kappos  
*Director of the United States Patent and Trademark Office*